(12) United States Patent
Pögel et al.

(10) Patent No.: US 11,280,632 B2
(45) Date of Patent: Mar. 22, 2022

(54) METHOD FOR REPRODUCING A MAP DISPLAY IN A TRANSPORTATION VEHICLE DEPENDING ON A DRIVING SITUATION

(71) Applicant: VOLKSWAGEN AKTIENGESELLSCHAFT, Wolfsburg (DE)

(72) Inventors: Tobias Pögel, Schwülper (DE); Gabriel Schwab, Wolfsburg (DE); Benjamin Gross, Braunschweig (DE)

(73) Assignee: Volkswagen Aktiengesellschaft

( * ) Notice: Subject to any disclaimer, the term of this patent is extended or adjusted under 35 U.S.C. 154(b) by 451 days.

(21) Appl. No.: 16/099,249

(22) PCT Filed: Apr. 11, 2017

(86) PCT No.: PCT/EP2017/058599
§ 371 (c)(1),
(2) Date: Nov. 6, 2018

(87) PCT Pub. No.: WO2017/194255
PCT Pub. Date: Nov. 16, 2017

(65) Prior Publication Data
US 2019/0195648 A1    Jun. 27, 2019

(30) Foreign Application Priority Data

May 10, 2016 (DE) ..................... 10 2016 207 991.3

(51) Int. Cl.
*G01C 21/36* (2006.01)
*G09B 29/10* (2006.01)
*G01S 19/42* (2010.01)

(52) U.S. Cl.
CPC ....... *G01C 21/367* (2013.01); *G01C 21/3658* (2013.01); *G01S 19/42* (2013.01); *G09B 29/106* (2013.01); *B60R 2300/804* (2013.01)

(58) Field of Classification Search
CPC .................................................. G01C 21/367
See application file for complete search history.

(56) References Cited

U.S. PATENT DOCUMENTS 5,638,279 A    6/1997 Kishi et al.
5,893,045 A    4/1999 Kusama et al.
(Continued)

FOREIGN PATENT DOCUMENTS

CN    1165950 A    11/1997
CN    1950863 A    4/2007
(Continued)

OTHER PUBLICATIONS

Search Report for German Patent Application No. 10 2016 207 991.3; dated Feb. 2, 2017.
(Continued)

*Primary Examiner* — Shelley Chen
(74) *Attorney, Agent, or Firm* — Barnes & Thornburg LLP

(57) ABSTRACT

A method for reproducing a map display depending on a driving situation, a device for reproducing a map display depending on a driving situation, and a transportation vehicle having a corresponding device. The method includes detecting one or more driving situation-dependent parameters, wherein at least one driving situation-dependent parameter is based on the geographical position; setting one or more display properties of the map display depending on the one or more detected driving situation-dependent parameters; and reproducing the set map display using a display device. This allows a map display adequate for a situation to be provided to a transportation vehicle operator, the map display clearly and intelligibly reproducing the information relevant to the present driving situation.

30 Claims, 3 Drawing Sheets

(56) References Cited

U.S. PATENT DOCUMENTS

| | | | |
|---|---|---|---|
| 6,163,750 A | 12/2000 | Nojima | |
| 6,175,802 B1 | 1/2001 | Okude et al. | |
| 6,381,534 B2 | 4/2002 | Takayama et al. | |
| 7,616,816 B2 * | 11/2009 | Cheng | G06F 16/7335 382/181 |
| 8,103,439 B2 | 1/2012 | Onishi et al. | |
| 8,798,927 B2 | 8/2014 | Rasshofer et al. | |
| 9,103,691 B2 | 8/2015 | Wäller et al. | |
| 10,055,987 B2 | 8/2018 | Stählin | |
| 10,163,345 B2 | 12/2018 | Nusser et al. | |
| 10,885,358 B2 * | 1/2021 | Lindemann | G06K 9/00818 |
| 2004/0162672 A1 | 8/2004 | Kim | |
| 2007/0225902 A1 | 9/2007 | Gretton et al. | |
| 2008/0021879 A1 * | 1/2008 | Cheng | G06F 16/743 |
| 2008/0288166 A1 * | 11/2008 | Onishi | G09B 29/106 701/533 |
| 2011/0022393 A1 * | 1/2011 | Waller | G01C 21/3664 704/270 |
| 2015/0243167 A1 * | 8/2015 | Stahlin | H04W 4/46 340/902 |

FOREIGN PATENT DOCUMENTS

| | | | | |
|---|---|---|---|---|
| CN | 101374691 A | 2/2009 | | |
| CN | 101855521 A | 10/2010 | | |
| CN | 104662872 A | 5/2015 | | |
| DE | 10105394 A1 | 8/2001 | | |
| DE | 10131720 A1 | 1/2003 | | |
| DE | 102004037900 A1 | 3/2006 | | |
| DE | 102006057920 A1 | 6/2008 | | |
| DE | 102008051756 A1 * | 5/2009 | | G06F 3/038 |
| DE | 102008051756 A1 | 5/2009 | | |
| DE | 102012217013 B3 | 3/2014 | | |
| DE | 102014201158 A1 | 7/2015 | | |
| EP | 1389728 A1 | 2/2004 | | |
| EP | 1746560 A1 * | 1/2007 | | G09B 29/106 |
| EP | 1746560 A1 | 1/2007 | | |
| JP | H10143066 A | 5/1998 | | |
| JP | 2002081953 A | 3/2002 | | |
| JP | 2005337963 A | 12/2005 | | |
| JP | 2011099815 A | 5/2011 | | |
| WO | 2009112190 A1 | 9/2009 | | |
| WO | 2014108152 A2 | 7/2014 | | |
| WO | 2015052312 A1 | 4/2015 | | |
| WO | 2015062816 A1 | 5/2015 | | |

OTHER PUBLICATIONS

Search Report for International Patent Application No. PCT/EP2017/058599; dated Jun. 9, 2017.

Office Action for Chinese Patent Application No. 201780028812.9; dated Oct. 11, 2021.

* cited by examiner

METHOD FOR REPRODUCING A MAP DISPLAY IN A TRANSPORTATION VEHICLE DEPENDING ON A DRIVING SITUATION

PRIORITY CLAIM

This patent application is a U.S. National Phase of International Patent Application No. PCT/EP2017/058599, filed 11 Apr. 2017, which claims priority to German Patent Application No. 10 2016 207 991.3, filed 10 May 2016, the disclosures of which are incorporated herein by reference in their entireties.

SUMMARY

Illustrative embodiments relate to a method for reproducing a map representation, for example, in the transportation vehicle, depending on the driving situation; an apparatus for reproducing a map representation depending on the driving situation; and a transportation vehicle having an apparatus of this kind.

BRIEF DESCRIPTION OF THE DRAWINGS

The disclosed embodiments are explained below based on the associated drawings, in which.

DETAILED DESCRIPTION

Figure 1:
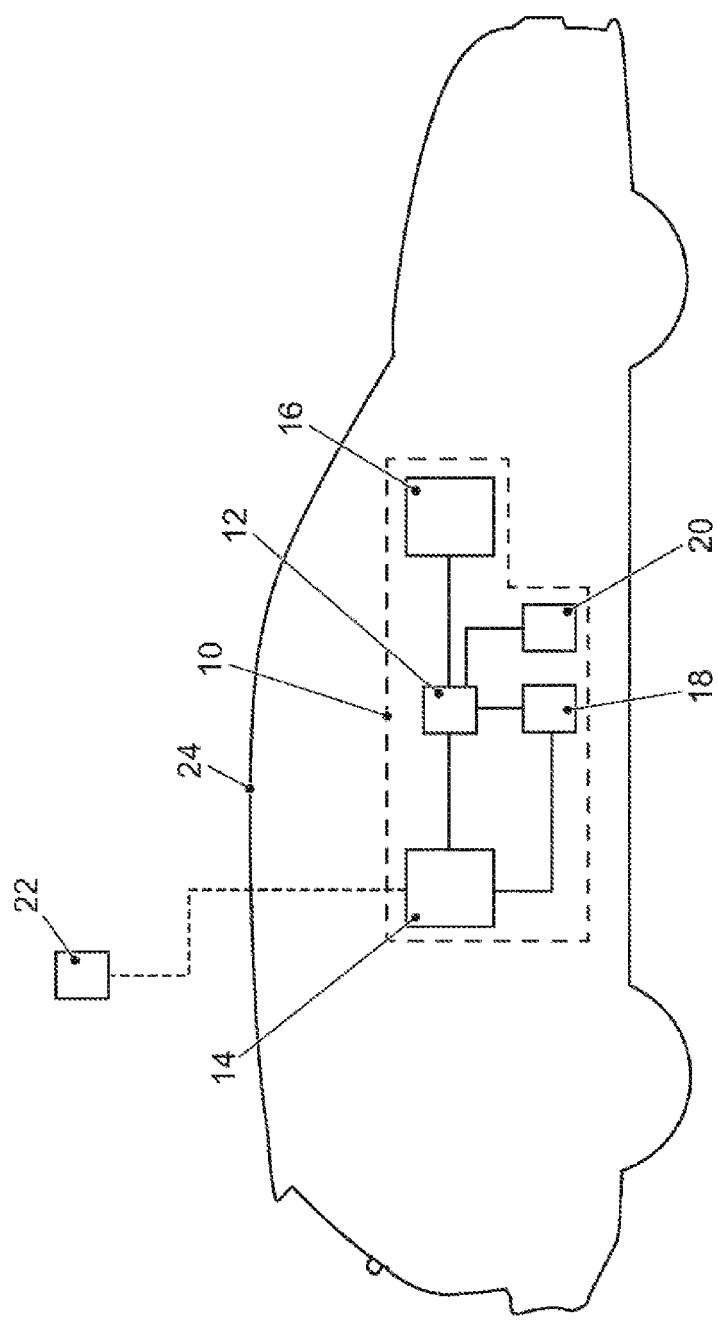
FIG. 1 shows a transportation vehicle having a disclosed apparatus for reproducing a map representation depending on the driving situation.

Known navigation systems that are actively used for route guidance use the map representation primarily to portray the road profile. The map detail of interest to the transportation vehicle driver and the type of representation are dependent on the present driving situation. Although known navigation systems permit the map representation to be adapted, settings are predominantly made manually or on the basis of driving-situation-independent parameters in this case.

Moreover, information intending to prompt the transportation vehicle driver to carry out a particular driving manoeuver or to observe a speed limit is usually displayed in a supplementary window. Supplementary windows of this kind partially conceal a considerable area of the actual map representation, however, which means that the opportunity for orientation and the overview of the road profile to be expected can be substantially impaired for the transportation vehicle driver.

The document DE 10 2008 051 756 A1 proposes scaling and enlarging a navigation map menu displayed on a monitor to reduce the complexity of operator control processes. Manipulation of the menu representation does not allow the designated problems to be overcome, however.

The document WO 2009/112190 A1 teaches an integrated map representation, the integrated map representation comprising a schematic map representation and a geographical map representation. To improve the intelligibility of the representation for a user, it is proposed that a suitable distortion be set. Depending on the degree of distortion and the output unit used, a degree of detail is then determined for the integrated map representation. Applicable adaptation of the map representation depending on the driving situation is not effected by this either, however.

The disclosed embodiments provide a way of, by way of example, providing a transportation vehicle driver with a map representation apt to the situation that reproduces the information relevant in the present driving situation clearly and intelligibly.

This is achieved by a method, an apparatus and a transportation vehicle.

The disclosed method involves one or more driving-situation-dependent parameters being captured and one or more representation properties of the map representation being set on the basis of the one or more captured driving-situation-dependent or movement-dependent parameters. According to the disclosed embodiments, at least one driving-situation-dependent or movement-dependent parameter is dependent on the geographic position. The selected map representation is then reproduced on a display in a transportation vehicle or on a smartphone by a display unit.

The disclosed method provides that a map representation can be reproduced that matches the driving situation and therefore also the geographical position of the transportation vehicle. Therefore, the map representation can adapt itself automatically, for example, when the transportation vehicle approaches a freeway exit on the journey route. The transportation vehicle driver will reduce the transportation vehicle speed in good time before the freeway exit is reached, so that the freeway can be left at a suitable transportation vehicle speed. The adaptation of the transportation vehicle speed results in a new driving situation, which means that the previously set map representation no longer permits capture of all of the information relevant to the traffic, since the roads in the area of the freeway exit permit a plurality of driving manoeuvers and additionally new traffic rules must be observed. The disclosed method allows the representation scale, that is to say the set zoom and/or the representation perspective, that is to say the set inclination or the set tilt, of the map representation to be adapted in a manner apt to the situation, for example, so that the transportation vehicle driver in the area of the freeway exit can have the information relevant in this driving situation displayed to him clearly and intelligibly.

The capturing of one or more driving-situation-dependent parameters can comprise the selecting of a journey route. After a journey route has been selected, it is then possible to capture a manoeuver area in which a driving manoeuver to follow the selected journey route needs to be carried out. Using the available map material, which is stored in a transportation vehicle-internal memory or is retrieved from a service, in particular, an online service, for example, it is therefore possible to identify road areas within which driving manoeuvers need to be carried out to follow the selected journey route. These may be road areas in which a turning operation, cornering, a lane change or filing into the flowing road traffic from an acceleration lane needs to be carried out, for example. Possible road areas under consideration are therefore junctions, curves, entry ramps and exit ramps. After a manoeuver area has been captured, the distance of the transportation vehicle from the captured maneuver area can be ascertained. The distance of the transportation vehicle from the captured manoeuver area is critical for whether the transportation vehicle driver already needs further information pertaining to the manoeuver area, for example, information pertaining to the roads to be expected within the manoeuver area. On the basis of the distance of the transportation vehicle from the manoeuver area, it is therefore possible for one or more representation properties of the map representation, such as, for example, the representation scale or the representation perspective, to be set to display a clear and intelligible map representation containing the relevant information to the transportation vehicle driver in the present traffic situation.

The capturing of one or more driving-situation-dependent parameters can comprise the capturing of a street furniture installation. Street furniture installations are road signs, sign posts, road markings or traffic lights, for example. Road signs may comprise hazard warning signs, regulation signs, directional signs or other signs relevant to traffic. A street furniture installation can be captured by retrieving information pertaining to street furniture installations along a journey route from a transportation vehicle-internal memory or a service, in particular, an online service, or by capturing street furniture installations using transportation vehicle sensors. When street furniture installations are captured using transportation vehicle sensors, capture by one or more cameras and an appropriate image evaluation routine is optional. Alternatively or additionally, street furniture installations can also be captured by vehicle-to-vehicle communication and/or vehicle-to-infrastructure communication. After a street furniture installation has been captured, the captured street furniture installation can be rated in terms of its relevance to the transportation vehicle. This is accomplished by a check to ascertain whether the captured street furniture installation needs to be taken into consideration when following the selected journey route, for example. Road signs that do not need to be taken into consideration when traveling along the selected journey route, for example, because they relate to traffic rules on an alternative journey route, such as a freeway exit ramp that is not on the intended journey route, can therefore be ignored when setting the representation properties for the map representation. The capturing of one or more driving-situation-dependent parameters can moreover comprise the capturing of a distance of the transportation vehicle from the captured street furniture installation. The distance of the transportation vehicle from a street furniture installation is critical for whether the street furniture installation is relevant in the present driving situation. If a road sign prescribing a permitted maximum speed on a road section is still several hundred meters away, it is not yet necessary to adapt the representation properties on the basis of this road sign. The representation properties can be adapted when the distance of the transportation vehicle from the road sign has decreased such that the transportation vehicle driver can see the road sign and at the same time the road sign needs to be taken into consideration.

As an alternative or in addition to the distance from a captured manoeuver area and the distance from a captured street furniture installation, the speed, the acceleration and the selected steering angle of the transportation vehicle and also the brightness inside or outside the transportation vehicle are also driving-situation-dependent parameters that can necessitate the setting of one or more representation properties of the map representation. Therefore, the capturing of one or more driving-situation-dependent parameters may likewise comprise the capturing of the current speed of the transportation vehicle, the capturing of the current acceleration of the transportation vehicle, the capturing of the currently set steering angle of the transportation vehicle and/or the capturing of a brightness value inside and/or outside the transportation vehicle. By way of example, the representation scale and/or the representation perspective is/are adapted on the basis of the transportation vehicle speed, which means that at a high transportation vehicle speed the reproduced map representation has a first representation scale and a first representation perspective and at a comparatively low transportation vehicle speed the reproduced map representation has a second representation scale and a second representation perspective.

The capturing of one or more driving-situation-dependent parameters can comprise the capturing of a distance of the transportation vehicle from a predefined position. Predefined positions can be retrieved from a transportation vehicle-internal memory or from a service, in particular, an online service, for example. Predefined positions along a journey route can relate to buildings, such as tunnels or bridges, or can denote town entries and town exits, for example.

The setting of one or more representation properties of the map representation on the basis of the one or more captured driving-situation-dependent parameters can comprise the setting of a representation scale on the basis of the one or more captured driving-situation-dependent parameters and/or the setting of a representation perspective on the basis of the one or more captured driving-situation-dependent parameters. The representation scale and the representation perspective of the map representation influence the clarity and intelligibility of the map representation to a substantial extent. Driving situations exist in which the transportation vehicle driver needs no detailed information about the road profile soon to be expected, for example, when traveling on a freeway section that extends over many kilometers. In this driving situation, the representation scale can be set such that a road section of applicable magnitude is displayed to the transportation vehicle driver, since detailed information pertaining to the road profile is not relevant to the transportation vehicle driver in the present driving situation. On the other hand, driving situations also exist in which the transportation vehicle driver needs detailed information about the road profile soon to be expected, for example, in the area of an inner-city junction or in the area of a freeway intersection that needs to be used to change to another freeway. In these driving situations, the representation scale can be set such that detailed information about the road profile or the roads is displayed to the transportation vehicle driver. Furthermore, the representation perspective of the map representation in the area of road signs relevant to the journey route can be set such that the road signs in the map representation can be represented clearly and intelligibly.

The setting of one or more representation properties of the map representation on the basis of the one or more captured driving-situation-dependent parameters can alternatively or additionally comprise the manipulating of the map representation on the basis of the one or more captured driving-situation-dependent parameters. This can comprise showing traffic rules to be obeyed, for example. In this way, the clarity and intelligibility of the map representation can be increased further.

The setting of the representation scale on the basis of the one or more captured driving-situation-dependent parameters can comprise the retrieving of one or more scale models, each scale model defining the dependency of the representation scale on one or more captured driving-situation-dependent parameters. In this way, every value of a captured driving-situation-dependent parameter, such as the distance from a manoeuver area or the current transportation vehicle speed, can be assigned a specific representation scale, for example. In this way, very precise control of the representation scale of the map representation can be effected on the basis of one or more captured driving-situation-dependent parameters, which means that the one or more retrieved scale models can be taken as a basis for selecting a suitable representation scale.

The setting of the representation perspective on the basis of one or more captured driving-situation-dependent parameters can comprise the retrieving of one or more inclination models, each inclination model defining the dependency of the representation perspective on one or more captured driving-situation-dependent parameters. In this way, every value of a captured driving-situation-dependent parameter, such as the distance from a manoeuver area or the current transportation vehicle speed, can be assigned a specific representation perspective, for example. In this way, very precise control of the representation perspective of the map representation can be effected on the basis of one or more captured driving-situation-dependent parameters, which means that the one or more retrieved inclination models can be taken as a basis for selecting a suitable representation perspective.

The one or more scale models and/or the one or more inclination models may each be a characteristic curve or a family of characteristic curves. A characteristic curve or a family of characteristic curves can be used to portray the one or more scale models and/or the one or more inclination models for illustrative purposes as a graph. This permits an engineer or the transportation vehicle driver, for example, to use an applicable menu to change the one or more scale models and/or the one or more inclination models, so that the map representation can be individually matched to the transportation vehicle driver.

The one or more scale models and/or the one or more inclination models can follow a linear function, a quadratic function, a polynomial function, a root function, a logarithmic function, a trigonometric function and/or an exponential function at least in sections. If the one or more scale models and/or the one or more inclination models follow an applicable function, adaptation is possible in a simple manner, namely by modifying the stored function. By way of example, a linear function is suitable for defining a scale model that stipulates the dependency of the representation scale on the transportation vehicle speed. Moreover, a logarithmic function is suitable for defining an inclination model that stipulates the dependency of the representation perspective on the transportation vehicle speed.

The one or more scale models and/or the one or more inclination models may be multidimensional functions. By way of example, the one or more scale models and/or the one or more inclination models are three dimensional, four dimensional or five dimensional functions. The use of multidimensional functions is beneficial if the representation scale and/or the representation perspective is meant to be influenceable by multiple driving-situation-dependent parameters. Therefore, the representation scale and/or the representation perspective may be dependent on a function that takes into consideration both the distance of the transportation vehicle from a manoeuver area and the transportation vehicle speed, for example. The map representation is therefore matched to the present driving situation even more precisely.

The selecting of a representation scale on the basis of the one or more retrieved scale models can comprise the allocating of priority values to the one or more driving-situation-dependent parameters and the selecting of a representation scale on the basis of the scale model that defines the dependency of the representation scale on the driving-situation-dependent parameter to which the highest priority has been allocated. By way of example, the transportation vehicle approaches freeway roadworks at a comparatively high speed, the transportation vehicle driver already being able to see an applicable roadworks sign. In this situation, a first scale model stipulating the representation scale on the basis of the transportation vehicle speed can clash with a second scale model stipulating the representation scale on the basis of the distance from the roadwork sign. The allocation of priority values allows the setting of the representation scale on the basis of the allocated priority values to be effected exclusively in accordance with the first scale model or the second scale model, for example. Alternatively, the two scale models can also be weighted in accordance with their priority value, which means that a representation scale taking into consideration both scale models can be set.

The selecting of a representation perspective on the basis of the one or more retrieved inclination models can comprise the allocating of priority values to the one or more driving-situation-dependent parameters and the selecting of a representation perspective on the basis of the inclination model that defines the dependency of the representation perspective on the driving-situation-dependent parameter to which the highest priority has been allocated. By way of example, the transportation vehicle approaches an inner-city junction at a comparatively high speed, the junction already being able to be seen by the transportation vehicle driver. In this situation, a first inclination model stipulating the representation perspective on the basis of the transportation vehicle speed can clash with a second inclination model stipulating the representation perspective on the basis of the distance from the junction. The allocation of priority values allows the setting of the representation perspective on the basis of the allocated priority values to be effected exclusively in accordance with the first inclination model or the second inclination model, for example. Alternatively, the two inclination models can also be weighted in accordance with their priority value, which means that a representation perspective taking into consideration both inclination models can be set.

The manipulating of the map representation on the basis of the one or more captured driving-situation-dependent parameters can comprise the integrating of one or more objects into the map representation on the basis of the one or more captured driving-situation-dependent parameters and/or the changing of the representation of the one or more integrated objects on the basis of the one or more captured driving-situation-dependent parameters. The objects integrable into the map representation are street furniture installations, in particular, road signs, and/or facilities peripheral to the road, such as filling stations, truck stops, restaurants or attractions, for example.

The disclosed apparatus comprises a data processing unit, a capture device for capturing one or more driving-situation-dependent parameters, at least one driving-situation-dependent parameter being dependent on the geographical position of the transportation vehicle, and a display unit for reproducing a map representation. The disclosed apparatus is configured to carry out a method for reproducing a map representation in a transportation vehicle depending on the driving situation according to at least one of the disclosed embodiments described above. The same benefits and modifications apply as described previously.

The disclosed transportation vehicle comprises an apparatus for reproducing a map representation depending on the driving situation, the apparatus being in a form according to the embodiment described above. The same benefits and modifications apply as described previously.

The various disclosed embodiments that are cited in this application are, unless stated otherwise on a case by case basis, combinable with one another.

FIG. 1 shows a transportation vehicle 24 that has an apparatus 10 for reproducing a map representation in the transportation vehicle 24 depending on the driving situation. The apparatus 10 comprises a data processing unit 12, a capture device 14 for capturing multiple driving-situation-dependent parameters and a display unit 16 for reproducing a map representation.

The capture device 14 of the apparatus 10 has a communication module by which a data interchange with an online service 22 can be effected. The capture device 14 is configured to retrieve positions of objects, such as street furniture installations, or road profile plans from the online service 22. Street furniture installations may be road signs, for example.

Furthermore, the apparatus 10 has a transportation vehicle-internal memory 18 connected to the data processing device 12 for signal-routing purposes. The transportation vehicle-internal memory 18 stores road map material. The transportation vehicle-internal memory 18 is moreover connected to the capture device 14 for signal routing purposes. Therefore, the capture device 14 can capture maneuver areas and objects stored in the road map material in the transportation vehicle internal memory 18.

Moreover, the apparatus 10 has a device 20 for geographical position determination. The device 20 is likewise connected to the data processing device 12 for signal routing purposes. In this example, the device 20 comprises a GPS (Global Positioning System) module and is configured to continuously provide the data processing device 12 with data about the current geographical position of the transportation vehicle 24.

The capture device 14 is therefore capable of capturing all of the maneuver areas within which a driving maneuver to follow a selected driving route needs to be carried out. Moreover, the capture device 14 can capture the street furniture installations that are along the journey route.

The data processing device 12 is configured to set the representation scale and the representation perspective of the map representation on the basis of the distance from the respective captured maneuver areas, the distance from the respective captured street furniture installations and the current transportation vehicle speed.

The representation scale and the representation perspective of the map representation are set on the basis of multiple scale and inclination models stored in the transportation vehicle internal memory 18. The scale models define the dependency of the representation scale on the distance from the respective captured maneuver areas, the distance from the respective captured street furniture installations and the current transportation vehicle speed. The inclination models likewise define the dependency of the representation perspective on the distance from the respective captured maneuver areas, the distance from the respective captured street furniture installations and the current transportation vehicle speed.

Figure 2:
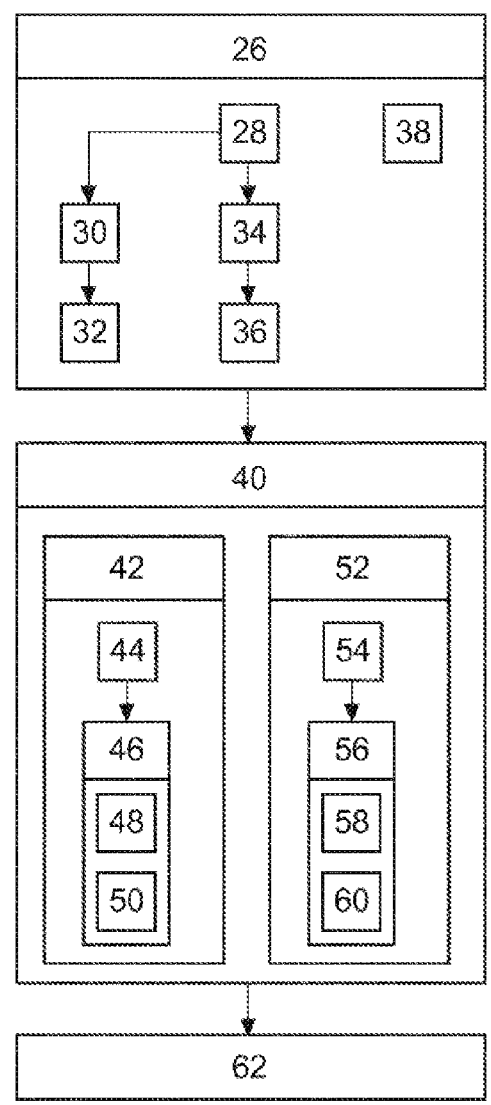
FIG. 2 shows a flowchart of the disclosed method for reproducing a map representation in a transportation vehicle depending on the driving situation.

FIG. 2 shows an exemplary embodiment of the disclosed method for reproducing a map representation in a transportation vehicle depending on the driving situation.

So that the map representation can be adapted on the basis of driving-situation-dependent parameters, the following operation is first of all performed: 26) capturing multiple driving-situation-dependent parameters.

The capturing of the multiple driving-situation-dependent parameters requires the apparatus to know a suitable journey route to reach a particular route destination. The capturing of the multiple driving-situation-dependent parameters, therefore, comprises the following operation: 28) selecting a journey route.

Once the journey route is known, the road area within which the next driving maneuver needs to be carried out can be ascertained, namely using the following operation: 30) capturing a maneuver area in which a driving maneuver to follow the selected journey route needs to be carried out.

On the basis of the captured maneuver area and the current geographical transportation vehicle position, which is able to be ascertained by a transportation vehicle-internal device for geographical position determination, for example, the distance from the maneuver area is captured using the operation of: 32) capturing a distance of the transportation vehicle from the captured maneuver area.

The captured distance of the transportation vehicle from the captured maneuver area is a driving-situation-dependent parameter dependent on the geographical position of the transportation vehicle, and is therefore one of the multiple driving-situation-dependent parameters on the basis of which the map representation is adapted.

In addition to the distance of the transportation vehicle from the next maneuver area, the distance of the transportation vehicle from a street furniture installation, for example, as a town entry sign, is monitored to take into consideration this driving-situation-dependent parameter for the map representation. To this end, the following operations are carried out: 34) capturing a town entry sign, and 36) capturing a distance of the transportation vehicle from the captured town entry sign.

Setting the map representation moreover results in the current transportation vehicle speed being taken into consideration as a further driving-situation-dependent parameter, which means that the following operation is carried out: 38) capturing the current speed of the transportation vehicle.

The current transportation vehicle speed is captured by a transportation vehicle-internal speed sensor. The transportation vehicle is likewise configured to ascertain the current transportation vehicle speed by the available GPS data.

Once all of the driving-situation-dependent parameters have been captured, the following operation can be carried out: 40) setting multiple representation properties of the map representation on the basis of the captured driving-situation-dependent parameters.

The setting of the multiple representation properties is divided into the following two method operations: 42) setting a representation scale on the basis of the captured driving-situation-dependent parameters; and 52) setting a representation perspective on the basis of the captured driving-situation-dependent parameters.

The captured driving-situation-dependent parameters are in this case the distance of the transportation vehicle from the captured maneuver area, the distance of the transportation vehicle from the captured town entry sign and the transportation vehicle speed. To be able to take theses driving-situation-dependent parameters as a basis for performing applicable adaptation of the representation scale, the following operation is carried out: 44) retrieving two scale models, the first scale model defining the dependency of the representation scale on the distance of the transportation vehicle from the town entry sign and the second scale model defining the dependency of the representation scale on the transportation vehicle speed.

The first retrieved scale model defines the representation scale as a function of the distance of the transportation vehicle from the town entry sign. Every distance value therefore has an assigned specific representation scale. The second retrieved scale model defines the representation scale as a function of the current transportation vehicle speed. Every transportation vehicle speed therefore has an assigned specific representation scale. Once the two scale models have been retrieved, the following operation can now be carried out: 46) selecting a representation scale on the basis of the retrieved scale models.

Since the representation scale resulting from the first scale model on the basis of the current distance from the town entry sign differs from the representation scale resulting from the second scale model on the basis of the current transportation vehicle speed, however, the following operation needs to be carried out: 48) allocating priority values to the driving-situation-dependent parameters.

In the present example, the town entry sign is already in visual range of the transportation vehicle driver. For this reason, the distance of the transportation vehicle from the town entry sign is allocated a higher priority than the current transportation vehicle speed, which means that the following operation can be carried out: 50) selecting a representation scale on the basis of the distance of the transportation vehicle from the town entry sign.

So that, besides a representation scale apt to the situation, it is likewise possible for a suitable representation perspective to be set for the present driving situation, the following operation is carried out: 54) retrieving two inclination models, the first inclination model defining the dependency of the representation perspective on the distance of the transportation vehicle from the captured maneuver area and the second inclination model defining the dependency of the representation perspective on the current transportation vehicle speed.

The first retrieved inclination model defines the representation perspective as a function of the distance of the transportation vehicle from the maneuver area. Every distance value therefore has an assigned specific representation perspective. The second retrieved inclination model defines the representation perspective as a function of the current transportation vehicle speed. Every transportation vehicle speed therefore has an assigned specific representation perspective. Once the two scale models have been retrieved, the following operation can now be carried out: 56) selecting a representation perspective on the basis of the retrieved inclination models.

Since the representation perspective resulting from the first inclination model on the basis of the current distance from the maneuver area differs from the representation perspective resulting from the second inclination model on the basis of the current transportation vehicle speed, however, the following operation needs to be carried out: 58) allocating priority values to the driving-situation-dependent parameters.

In the present example, the maneuver area is already in visual range of the transportation vehicle driver. For this reason, the distance of the transportation vehicle from the maneuver area is allocated a higher priority than the current transportation vehicle speed, which means that the following operation can be carried out: 60) selecting a representation perspective on the basis of the distance of the transportation vehicle from the maneuver area.

Once a suitable representation scale and a suitable representation perspective have been set, the following operation can finally be carried out: 62) reproducing the set map representation by a display unit in the transportation vehicle.

Figure 3:
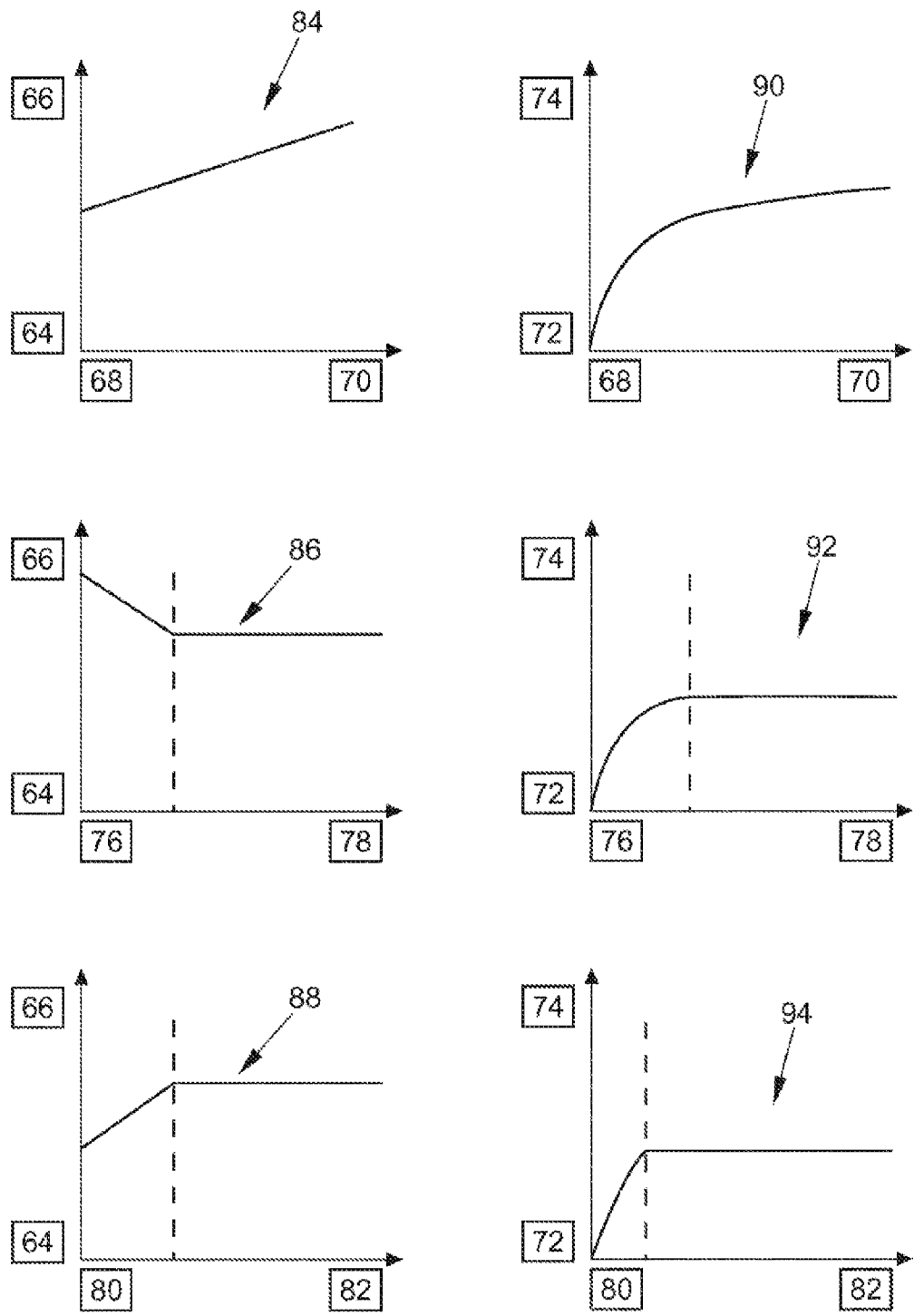
FIG. 3 shows multiple scale and inclination models.

FIG. 3 shows a total of three inclination models 84-88 and three scale models 90-94.

The inclination model 84 defines the dependency of the representation perspective on the transportation vehicle speed. The depicted coordinate system on which the inclination model 84 is based extends on the vertical axis from a first angle of inclination 64, for example, 0 degrees, to a second angle of inclination 66, for example, 90 degrees, and on the horizontal axis from a first transportation vehicle speed 68, for example, 0 km/h (kilometers per hour), to a second transportation vehicle speed 70, for example, 250 km/h. The inclination model 84 follows a linear function.

The scale model 90 defines the dependency of the representation scale on the transportation vehicle speed. The depicted coordinate system on which the scale model 90 is based extends on the vertical axis from a first representation scale 72, for example, 1:100, to a second representation scale 74, for example, 1:40000, and on the horizontal axis from a first transportation vehicle speed 68, for example, 0 km/h (kilometers per hour), to a second transportation vehicle speed 70, for example, 250 km/h. The scale model 90 follows a logarithmic function.

The inclination model 86 defines the dependency of the representation perspective on the distance from a road sign. The depicted coordinate system on which the inclination model 86 is based extends on the vertical axis from a first angle of inclination 64, for example, 0 degrees, to a second angle of inclination 66, for example, 90 degrees, and on the horizontal axis from a first distance 76 from the road sign, for example, 0 meters, to a second distance 78 from the road sign, for example, 3000 meters. The inclination model 86 follows a linear function in a first section and a constant in a second section.

The scale model 92 defines the dependency of the representation scale on the distance from the road sign. The depicted coordinate system on which the scale model 92 is based extends on the vertical axis from a first representation scale 72, for example, 1:100, to a second representation scale 74, for example, 1:40000, and on the horizontal axis from a first distance 76 from the road sign, for example, 0 meters, to a second distance 78 from the road sign, for example, 3000 meters. The scale model 92 follows a logarithmic function in a first section and a constant in a second section.

The inclination model 88 defines the dependency of the representation perspective on the distance from a freeway exit. The depicted coordinate system on which the inclination model 88 is based extends on the vertical axis from a first angle of inclination 64, for example, 0 degrees, to a second angle of inclination 66, for example, 90 degrees, and on the horizontal axis from a first distance 80 from the freeway exit, for example, 0 meters, to a second distance 82 from the freeway exit, for example, 3000 meters. The inclination model 88 follows a linear function in a first section and a constant in a second section.

The scale model 94 defines the dependency of the representation scale on the distance from the freeway exit. The depicted coordinate system on which the scale model 94 is based extends on the vertical axis from a first representation scale 72, for example, 1:100, to a second representation scale 74, for example, 1:40000, and on the horizontal axis from a first distance 80 from the freeway exit, for example, 0 meters, to a second distance 82 from the freeway exit, for example, 3000 meters. The scale model 94 follows a polynomial function in a first section and a constant in a second section.

The disclosed embodiments, therefore, permit automatic adaptation of the map representation taking into consideration the present driving situation, which means that the transportation vehicle driver is always provided with a map representation that is apt to the situation and reproduces the currently relevant information clearly and intelligibly.

It is within the spirit of the disclosure for the map representation to be effected on a smartphone carried in the transportation vehicle. Applicable information is transmitted to the smartphone (mobile device) by coupling to the transportation vehicle, for example, via a wireless interface such as wlan.

LIST OF REFERENCE SIGNS

10 Apparatus
12 Data processing unit
14 Capture device
16 Display unit
18 Transportation vehicle internal memory
20 Device for geographical position determination
22 Online service
24 Transportation vehicle
26-62 Method operations
64 Angle of inclination
66 Angle of inclination
68 Transportation vehicle speed
70 Transportation vehicle speed
72 Representation scale
74 Representation scale
76 Distance from a road sign
78 Distance from a road sign
80 Distance from a freeway exit
82 Distance from a freeway exit
84-88 Inclination models
90-94 Scale models

The invention claimed is:

1. A method for adapting a map representation on a transportation vehicle user interface depending on a presently sensed transportation vehicle driving situation, the method comprising:
capturing one or more driving-situation-dependent parameters;
setting one or more representation properties of the map representation based on the one or more captured driving-situation-dependent parameters to generate an adapted map representation, at least one of the one or more driving-situation-dependent parameter being dependent on a geographical position of the transportation vehicle, wherein the setting of the one or more representation properties of the map representation based on the one or more captured driving-situation-dependent parameters includes:
setting a representation scale based on the one or more captured driving-situation-dependent parameters by selecting a representation scale by retrieving one or more representation scale models, wherein each representation scale model defines a dependency of the respective representation scale on one or more captured driving-situation-dependent parameters, and selecting a representation scale based on the one or more retrieved scale models, and
setting a representation perspective based on the one or more captured driving-situation-dependent parameters by retrieving one or more inclination models, each inclination model defining the dependency of the respective representation perspective on one or more captured driving-situation-dependent parameters, and selecting a representation perspective based on the one or more retrieved inclination models; and
automatically reproducing the adapted map representation on a display unit of the transportation vehicle user interface in response to the generation of the adapted map representation,
wherein the one or more representation scale models and the one or more inclination models are multidimensional functions of at least three dimensions whereby both the representation scale and the representation perspective are each influenced by multiple driving-situation-dependent parameters including at least distance of the transportation vehicle from a manoeuver area and transportation vehicle speed.

2. The method of claim 1, wherein the capturing of one or more driving-situation-dependent parameters comprises at least one of:
selecting a journey route in response to user instruction received via the transportation vehicle user interface;
capturing a maneuver area where a driving maneuver required to follow the selected journey route needs to be carried out;
capturing a distance of the transportation vehicle from the captured maneuver area.

3. The method of claim 1, wherein the capturing of one or more driving-situation-dependent parameters comprises at least one of:
capturing data identifying a street furniture installation;
rating the captured street furniture installation data in terms of its relevance to the transportation vehicle; and
capturing a distance of the transportation vehicle from the captured street furniture installation.

4. The method of claim 1, wherein the capturing of one or more driving-situation-dependent parameters comprises at least one of:
capturing a current speed of the transportation vehicle;
capturing a current acceleration of the transportation vehicle;
capturing a currently set steering angle of the transportation vehicle; and
capturing a brightness value inside and/or outside the transportation vehicle.

5. The method of claim 1, wherein the capturing of the one or more driving-situation-dependent parameters comprises capturing a distance of the transportation vehicle from a predefined position.

6. The method of claim 1, wherein the setting of one or more representation properties of the map representation based on the one or more captured driving-situation-dependent parameters comprises:
manipulating the map representation based on the one or more captured driving-situation-dependent parameters.

7. The method of claim 1, wherein the one or more representation scale models and/or the one or more inclination models are each a characteristic curve or a family of characteristic curves.

8. The method of claim 1, wherein the one or more representation scale models and/or the one or more inclination models follow a linear function, a quadratic function, a polynomial function, a root function, a logarithmic function, a trigonometric function and/or an exponential function at least in sections.

9. The method of claim 1, wherein the selecting of a representation scale based on the one or more retrieved representation scale models and/or the selecting of a representation perspective based on the one or more retrieved inclination models comprises at least one of:
allocating priority values to the one or more driving-situation-dependent parameters;

selecting a representation scale based on the scale model that defines the dependency of the representation scale on the driving-situation-dependent parameter to which the highest priority has been allocated; and selecting a representation perspective based on the inclination model that defines the dependency of the representation perspective on the driving-situation-dependent parameter to which the highest priority has been allocated.

10. The method of claim 6, wherein the manipulating of the map representation based on the one or more captured driving-situation-dependent parameters comprises at least one of:

integrating one or more objects into the map representation based on the one or more captured driving-situation-dependent parameters; and changing the representation of the one or more integrated objects based on the one or more captured driving-situation-dependent parameters.

11. An apparatus for adapting a map representation by a user interface of a transportation vehicle depending on a presently sensed transportation vehicle driving situation, the apparatus comprising:

a data processing unit;

a capture device for capturing one or more driving-situation-dependent parameters, at least one driving-situation-dependent parameter being dependent on the geographical position of the transportation vehicle; and a user interface including a display unit for displaying the adapted map representation;

wherein the apparatus carries out a method comprising:

capturing one or more driving-situation-dependent parameters;

setting one or more representation properties of the map representation based on the one or more captured driving-situation-dependent parameters to generate an adapted map representation, at least one of the one or more driving-situation-dependent parameter being dependent on a geographical position of the transportation vehicle, wherein the setting of the one or more representation properties of the map representation based on the one or more captured driving-situation-dependent parameters includes:

setting a representation scale based on the one or more captured driving-situation-dependent parameters by selecting a representation scale by retrieving one or more representation scale models, wherein each representation scale model defines a dependency of the respective representation scale on one or more captured driving-situation-dependent parameters, and selecting a representation scale based on the one or more retrieved scale models, and setting a representation perspective based on the one or more captured driving-situation-dependent parameters by retrieving one or more inclination models, each inclination model defining the dependency of the respective representation perspective on one or more captured driving-situation-dependent parameters, and selecting a representation perspective based on the one or more retrieved inclination models; and automatically reproducing the adapted map representation on a display unit of the transportation vehicle user interface in response to the generation of the adapted map representation, wherein the one or more representation scale models and the one or more inclination models are multidimensional functions of at least three dimensions whereby both the representation scale and the representation perspective are each influenced by multiple driving-situation-dependent parameters including at least distance of the transportation vehicle from a manoeuver area and transportation vehicle speed.

12. A transportation vehicle comprising an apparatus for adapting a map representation for display on a user interface of the transportation vehicle depending on the transportation vehicle driving situation, the apparatus comprising:

a data processing unit;

a capture device for capturing one or more driving-situation-dependent parameters, at least one driving-situation-dependent parameter being dependent on the geographical position of the transportation vehicle; and a user interface including a display unit for displaying the adapted map representation;

wherein the apparatus carries out a method comprising:

capturing one or more driving-situation-dependent parameters;

setting one or more representation properties of the map representation based on the one or more captured driving-situation-dependent parameters to generate an adapted map representation, at least one of the one or more driving-situation-dependent parameter being dependent on a geographical position of the transportation vehicle, wherein the setting of the one or more representation properties of the map representation based on the one or more captured driving-situation-dependent parameters includes:

setting a representation scale based on the one or more captured driving-situation-dependent parameters by selecting a representation scale by retrieving one or more representation scale models, wherein each representation scale model defines a dependency of the respective representation scale on one or more captured driving-situation-dependent parameters, and selecting a representation scale based on the one or more retrieved scale models, and setting a representation perspective based on the one or more captured driving-situation-dependent parameters by retrieving one or more inclination models, each inclination model defining the dependency of the respective representation perspective on one or more captured driving-situation-dependent parameters, and selecting a representation perspective based on the one or more retrieved inclination models; and automatically reproducing the adapted map representation on a display unit of the transportation vehicle user interface in response to the generation of the adapted map representation, wherein the one or more representation scale models and the one or more inclination models are multidimensional functions of at least three dimensions whereby both the representation scale and the representation perspective are each influenced by multiple driving-situation-dependent parameters including at least distance of the transportation vehicle from a manoeuver area and transportation vehicle speed.

13. The apparatus of claim 11, wherein the capturing of one or more driving-situation-dependent parameters comprises:
- selecting a journey route in response to user instruction received via the transportation vehicle user interface;
- capturing a maneuver area where a driving maneuver required to follow the selected journey route needs to be carried out;
- capturing a distance of the transportation vehicle from the captured maneuver area.

14. The apparatus of claim 11, wherein the capturing of one or more driving-situation-dependent parameters comprises at least one of:
- capturing data identifying a street furniture installation;
- rating the captured street furniture installation data in terms of its relevance to the transportation vehicle; and
- capturing a distance of the transportation vehicle from the captured street furniture installation.

15. The apparatus of claim 11, wherein the capturing of one or more driving-situation-dependent parameters comprises at least one of:
- capturing a current speed of the transportation vehicle;
- capturing a current acceleration of the transportation vehicle;
- capturing a currently set steering angle of the transportation vehicle; and
- capturing a brightness value inside and/or outside the transportation vehicle.

16. The apparatus of claim 11, wherein the capturing of the one or more driving-situation-dependent parameters comprises capturing a distance of the transportation vehicle from a predefined position.

17. The apparatus of claim 11, wherein the setting of one or more representation properties of the map representation based on the one or more captured driving-situation-dependent parameters comprises:
- manipulating the map representation based on the one or more captured driving-situation-dependent parameters.

18. The apparatus of claim 11, wherein the one or more representation scale models and/or the one or more inclination models are each a characteristic curve or a family of characteristic curves.

19. The apparatus of claim 11, wherein the one or more representation scale models and/or the one or more inclination models follow a linear function, a quadratic function, a polynomial function, a root function, a logarithmic function, a trigonometric function and/or an exponential function at least in sections.

20. The apparatus of claim 11, wherein the selecting of a representation scale based on the one or more retrieved representation scale models and/or the selecting of a representation perspective based on the one or more retrieved inclination models comprises at least one of:
- allocating priority values to the one or more driving-situation-dependent parameters;
- selecting a representation scale based on the scale model that defines the dependency of the representation scale on the driving-situation-dependent parameter to which the highest priority has been allocated; and
- selecting a representation perspective based on the inclination model that defines the dependency of the representation perspective on the driving-situation-dependent parameter to which the highest priority has been allocated.

21. The apparatus of claim 17, wherein the manipulating of the map representation based on the one or more captured driving-situation-dependent parameters comprises at least one of:
- integrating one or more objects into the map representation based on the one or more captured driving-situation-dependent parameters; and
- changing the representation of the one or more integrated objects based on the one or more captured driving-situation-dependent parameters.

22. The transportation vehicle of claim 12, wherein the capturing of one or more driving-situation-dependent parameters comprises at least one of:
- selecting a journey route in response to user instruction received via the transportation vehicle user interface;
- capturing a maneuver area where a driving maneuver required to follow the selected journey route needs to be carried out;
- capturing a distance of the transportation vehicle from the captured maneuver area.

23. The transportation vehicle of claim 12, wherein the capturing of one or more driving-situation-dependent parameters comprises at least one of:
- capturing data identifying a street furniture installation;
- rating the captured street furniture installation data in terms of its relevance to the transportation vehicle; and
- capturing a distance of the transportation vehicle from the captured street furniture installation.

24. The transportation vehicle of claim 12, wherein the capturing of one or more driving-situation-dependent parameters comprises at least one of:
- capturing a current speed of the transportation vehicle;
- capturing a current acceleration of the transportation vehicle;
- capturing a currently set steering angle of the transportation vehicle; and
- capturing a brightness value inside and/or outside the transportation vehicle.

25. The transportation vehicle of claim 12, wherein the capturing of the one or more driving-situation-dependent parameters comprises capturing a distance of the transportation vehicle from a predefined position.

26. The transportation vehicle of claim 12, wherein the setting of one or more representation properties of the map representation based on the one or more captured driving-situation-dependent parameters comprises at least one of:
- manipulating the map representation based on the one or more captured driving-situation-dependent parameters.

27. The transportation vehicle of claim 12, wherein the one or more representation scale models and/or the one or more inclination models are each a characteristic curve or a family of characteristic curves.

28. The transportation vehicle of claim 12, wherein the one or more representation scale models and/or the one or more inclination models follow a linear function, a quadratic function, a polynomial function, a root function, a logarithmic function, a trigonometric function and/or an exponential function at least in sections.

29. The transportation vehicle of claim 12, wherein the selecting of a representation scale based on the one or more retrieved representation scale models and/or the selecting of a representation perspective based on the one or more retrieved inclination models comprises at least one of:
- allocating priority values to the one or more driving-situation-dependent parameters;
- selecting a representation scale based on the scale model that defines the dependency of the representation scale on the driving-situation-dependent parameter to which the highest priority has been allocated; and selecting a representation perspective based on the inclination model that defines the dependency of the representation perspective on the driving-situation-dependent parameter to which the highest priority has been allocated.

30. The transportation vehicle of claim 26, wherein the manipulating of the map representation based on the one or more captured driving-situation-dependent parameters comprises at least one of:

integrating one or more objects into the map representation based on the one or more captured driving-situation-dependent parameters; and changing the representation of the one or more integrated objects based on the one or more captured driving-situation-dependent parameters.

* * * * *